US008069564B2

(12) United States Patent
Yanagisawa et al.

(10) Patent No.: US 8,069,564 B2
(45) Date of Patent: Dec. 6, 2011

(54) ALIGNMENT JIG AND ALIGNMENT APPARATUS FOR LIQUID-JET HEAD AND METHOD FOR PRODUCING LIQUID-JET HEAD

(75) Inventors: Isao Yanagisawa, Chino (JP); Yasuo Inaoka, Shiojiri (JP); Takuma Okamuro, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 516 days.

(21) Appl. No.: 11/852,744

(22) Filed: Sep. 10, 2007

(65) Prior Publication Data

US 2008/0062218 A1 Mar. 13, 2008

(30) Foreign Application Priority Data

Sep. 8, 2006 (JP) ................................. 2006-244572

(51) Int. Cl.
*B21D 53/76* (2006.01)
*B23P 19/00* (2006.01)
*B23P 17/00* (2006.01)

(52) U.S. Cl. ...................................... 29/890.1; 759/760

(58) Field of Classification Search ................. 29/890.1, 29/759, 760
See application file for complete search history.

(56) References Cited

U.S. PATENT DOCUMENTS 4,614,431 A * 9/1986 Komeyama ................... 356/401
4,683,477 A * 7/1987 Braun et al. ..................... 347/68
5,192,959 A * 3/1993 Drake et al. .................... 347/42
5,297,333 A * 3/1994 Kusaka ........................... 29/840
5,842,258 A * 12/1998 Harvey et al. ................ 29/890.1
5,856,833 A * 1/1999 Elgee et al. ...................... 347/19
5,881,453 A * 3/1999 Avery et al. ...................... 29/834
5,884,393 A * 3/1999 Miyazawa ....................... 29/739
6,371,591 B1 * 4/2002 Conta et al. ..................... 347/19
6,375,310 B1 * 4/2002 Arakawa et al. ................ 347/54
6,450,614 B1 * 9/2002 Scheffelin et al. .............. 347/42
6,516,512 B1 * 2/2003 Yamauchi ........................ 29/764
6,921,629 B2 * 7/2005 Linliu et al. .................. 430/320
6,938,328 B2 * 9/2005 Mehdianpour et al. ......... 29/739
2001/0045043 A1 * 11/2001 Lebrun ........................... 40/800
2002/0051031 A1 * 5/2002 Shin et al. ....................... 347/40
2003/0081081 A1 * 5/2003 Tomita et al. ................... 347/70
2003/0085951 A1 * 5/2003 Keenan et al. .................. 347/44
2003/0188827 A1 * 10/2003 Murthy et al. ............. 156/275.1
2004/0012734 A1 * 1/2004 Yamanaka et al. .............. 349/95
2004/0088859 A1 * 5/2004 Ito et al. ....................... 29/890.1
2004/0095419 A1 * 5/2004 Silverbrook .................... 347/40
2004/0163243 A1 * 8/2004 Noda et al. ...................... 29/834
2004/0165028 A1 * 8/2004 Ito et al. .......................... 347/20
2005/0001868 A1 * 1/2005 Matsuba et al. ................ 347/17
2005/0001877 A1 * 1/2005 Chikanawa et al. ............ 347/42
(Continued)

FOREIGN PATENT DOCUMENTS

JP 08-006005 1/1996
(Continued)

*Primary Examiner* — David Angwin
(74) *Attorney, Agent, or Firm* — Sughrue Mion, PLLC

(57) ABSTRACT

An alignment jig for a liquid-jet head, which is used when positioning and joining a nozzle plate and a fixing member, the nozzle plate having nozzle orifices for jetting a liquid of the liquid-jet head and an alignment mark for alignment, the fixing member being adapted to hold a plurality of the liquid-jet heads, the alignment jig comprising a mask which is a transparent member provided with a reference mark for alignment with the alignment mark, the reference mark being formed within the mask.

7 Claims, 10 Drawing Sheets

U.S. PATENT DOCUMENTS

| | | | | |
|---|---|---|---|---|
| 2005/0001881 | A1* | 1/2005 | Nakashima et al. | 347/50 |
| 2005/0134647 | A1* | 6/2005 | Silverbrook | 347/54 |
| 2005/0193653 | A1* | 9/2005 | Cornell | 52/204.1 |
| 2005/0202586 | A1* | 9/2005 | Yamanaka et al. | 438/70 |
| 2005/0268449 | A1* | 12/2005 | Medina et al. | 29/281.1 |
| 2006/0127580 | A1* | 6/2006 | Bae et al. | 427/256 |
| 2006/0158486 | A1* | 7/2006 | Bibl et al. | 347/68 |
| 2006/0199353 | A1* | 9/2006 | Kub et al. | 438/455 |
| 2008/0068423 | A1* | 3/2008 | Saito et al. | 347/50 |
| 2008/0130708 | A1* | 6/2008 | Coney et al. | 374/144 |

FOREIGN PATENT DOCUMENTS

| | | | |
|---|---|---|---|
| JP | 2002-160376 | * | 4/2002 |
| JP | 2002-160376 | A | 6/2002 |
| JP | 2004-345281 | A | 12/2004 |
| JP | 2005-096366 | A | 4/2005 |
| JP | 2006-281604 | A | 10/2006 |
| JP | 2006-326937 | A | 12/2006 |
| JP | 2006-327024 | A | 12/2006 |
| JP | 3893936 | B2 | 12/2006 |

* cited by examiner

ALIGNMENT JIG AND ALIGNMENT APPARATUS FOR LIQUID-JET HEAD AND METHOD FOR PRODUCING LIQUID-JET HEAD

The entire disclosure of Japanese Patent Application No. 2006-244572 filed Sep. 8, 2006 is expressly incorporated by reference herein.

BACKGROUND

1. Technical Field

The present invention relates to an alignment jig and an alignment apparatus for a liquid-jet head, which are useful, particularly, when used in high accuracy alignment of the liquid-jet head with an alignment mark printed on a mask as a transparent member; and also relates to a method for producing the liquid-jet head.

2. Related Art

An ink-jet recording apparatus, such as an ink-jet printer or an ink-jet plotter, is equipped with an ink-jet recording head unit (may be hereinafter referred to as a head unit) including an ink-jet recording head which ejects, as ink droplets, ink accommodated in a liquid accommodation portion such as an ink cartridge or an ink tank. The ink-jet recording head has nozzle rows comprising rows of nozzle orifices arranged in parallel, and has its ink ejection surface side covered with a cover head. The cover head has a window frame portion having an opening window portion provided on the ink droplet ejection surface side of the ink-jet recording head for exposing a nozzle opening, and has a side wall portion formed by being bent from the window frame portion beside the side surface of the ink-jet recording head. The cover head is fixed by having the side wall portion joined to the side surface of the ink-jet recording head (see, for example, JP-A-2002-160376 (page 4, FIG. 3)).

When the cover head and a fixing member, such as a fixing plate, are to be joined to a plurality of the ink-jet recording heads, the ink-jet recording heads are moved with respect to the fixing member for predetermined positioning so that an alignment mark provided in a nozzle plate aligns with a reference mark provided in a flat plate-shaped glass mask. The reference mark is generally formed on the surface of the glass mask by chrome printing or the like (see, for example, JP-A-2004-345281 (page 10, FIG. 3)).

However, when the reference mark is formed on the surface of the glass mask, as mentioned above, the problem arises that the reference mark is damaged by chipping or scarring, for example, due to the contact of the surface of the glass mask with the liquid-jet head. To achieve high accuracy positioning, the distance between the reference mark and the alignment mark needs to be minimized. Nevertheless, it has been difficult to support the nozzle plate directly on the surface of the glass mask via the fixing member.

To raise the accuracy of alignment, it is necessary to increase the magnification of an optical system in an optical means for observing the reference mark and the alignment mark. When the magnification is increased, however, the reference mark needs to be rendered smaller and to be formed from thinner lines, in accordance with the increase in the magnification. The smaller and the thinner the reference mark becomes, the higher the risk of the aforementioned chipping or scarring becomes.

Such a problem occurs not only with alignment associated with the production of an ink-jet recording head unit, but also with alignment associated with the production of other liquid-jet head units.

SUMMARY

An advantage of some aspects of the present invention is to provide an alignment jig and an alignment apparatus for a liquid-jet head which can prevent damage to the mask and contribute to high accuracy positioning; and a method for producing the liquid-jet head.

According to an aspect of the invention, there is provided an alignment jig for a liquid-jet head, which is used when positioning and joining a nozzle plate and a fixing member, the nozzle plate having nozzle orifices for jetting a liquid of the liquid-jet head and an alignment mark for alignment, the fixing member being adapted to hold a plurality of the liquid-jet heads, the alignment jig comprising a mask which is a transparent member provided with a reference mark for alignment with the alignment mark, the reference mark being formed within the mask.

According to the present embodiment, the reference mark is provided within the mask. Thus, even if an external force acts on the surface of the mask, the reference mark is free from chipping or scarring, and the predetermined function of the reference mark can be shown for a long term.

As a result, predetermined high accuracy alignment can be performed stably for a long term.

Since the reference mark is located at some depth from the surface of the mask, moreover, a predetermined distance is ensured between the reference mark and the alignment mark. Hence, the zone ranging from the position of the mask, where the reference mark exists, to the surface of the mask can function as a substantial spacer. That is, for a conventional alignment jig in which a spacer jig is interposed between a mask and a nozzle plate to ensure spacing between them, the mask of the present embodiment concurrently functions as a mask and a spacer jig. Consequently, the effect that the above-mentioned spacer jig can be removed is exhibited.

It is preferable that the mask has a mask body, and a protective plate stuck to a surface of the mask body facing the liquid-jet head, and the reference mark is formed at a boundary between the mask body and the protective plate, the boundary serving as a joining surface.

According to this embodiment, the reference mark is protected by the mask body and the protective plate. Thus, the reference mark can be prevented from chipping or scarring. The reference mark may be formed on the surface of the mask body or the protective plate, so that the reference mark can be formed in the mask easily and high accurately It is also preferable that the mask has a mask body, and a protective plate stuck to a surface of the mask body facing the liquid-jet head, the reference mark is formed on a surface of the mask body facing the liquid-jet head, or on a surface of the protective plate facing the mask body, and a predetermined space is present above the reference mark.

According to this embodiment, the adhesive agent sticking the protective plate and the mask body does not touch the top of the reference mark. Thus, when the mask body and the protective plate are joined together, no irregularities of the adhesive agent occur on the top of the reference mark. Consequently, highly accurate alignment can be performed.

In the above embodiment, the protective plate may have a smaller area in a plane direction than an area of the mask body, and may be stuck to the mask body in a region opposed to the reference mark.

According to this embodiment, the protective plate is formed with a smaller area than that of the mask body. Thus, alignment can be performed, with the mask being brought closer to the nozzle plate of the liquid-jet head.

It is also preferable that the mask comprises a mask body having the reference mark formed inside.

According to this embodiment, the reference mark can be easily formed at a desired depth position within the mask body. Coupled with the ease of microfabrication, this method can fully and easily achieve miniaturization of the reference mark associated with high magnification of the optical systems.

In the above embodiment, the mask body may have a protrusion formed in a region where the reference mark is formed, the protrusion protruding toward the liquid-jet head.

According to this embodiment, the protrusion is formed in the mask body. Thus, alignment can be carried out, with the mask being brought closer to the nozzle plate of the liquid-jet head.

According to another aspect of the invention, there is provided an alignment apparatus for a liquid-jet head, comprising: the alignment jig according to the aforementioned aspect; and a bifocal microscope including two optical systems having an optical axis in common, the optical axis being pointed in a direction of the alignment mark via the reference mark from a side of the mask opposite to the fixing member, one of the optical systems being capable of focusing on the alignment mark, and the other optical system being capable of focusing on the reference mark.

According to the present embodiment, the reference mark is provided within the mask. Thus, even if an external force acts on the surface of the mask, the reference mark is free from chipping or scarring, and the predetermined function of the reference mark can be shown for a long term.

Hence, predetermined high accuracy alignment can be performed stably for a long term.

Since the reference mark is located at some depth from the surface of the mask, moreover, a predetermined distance is ensured between the reference mark and the alignment mark. Hence, the zone ranging from the position of the mask, where the reference mark exists, to the surface of the mask can function as a substantial spacer.

As a result, the reference mark and the alignment mark are spaced from each other. If one of the marks is in focus, the other mark is out of focus. Consequently, the problem is caused that the depth of field of the optical system has to be increased at the sacrifice of the magnification.

According to the present embodiment, on the other hand, the reference mark and the alignment mark can be seen at the same time using the bifocal microscope. Thus, predetermined positioning can be performed by superimposing the image of the reference mark and the image of the alignment mark individually focused by the one optical system and the other optical system. That is, the depth of field of each of the optical systems can be minimized, and the magnification can be increased accordingly.

Because of this advantage as well, the predetermined positioning of the liquid-jet head can be performed with high accuracy.

According to a further aspect of the invention, there is provided a method for producing a liquid-jet head including a nozzle plate and a fixing member, the nozzle plate having nozzle orifices for jetting a liquid of the liquid-jet head and an alignment mark for alignment, the fixing member being adapted to hold a plurality of the liquid-jet heads, comprising the steps of: holding the fixing member by a mask in direct contact with the fixing member, the mask being a transparent member provided with a reference mark for alignment with the alignment mark, the reference mark being formed within the mask; aligning the alignment mark with the reference mark; and bonding the nozzle plate and the fixing member by an adhesive agent.

It is preferable that the mask has a mask body, and a protective plate stuck to a surface of the mask body facing the liquid-jet head; the reference mark is formed at a boundary between the mask body and the protective plate, the boundary serving as a joining surface; and the fixing member is held by the protective plate in direct contact with the fixing member.

It is also preferable that the mask has a mask body, and a protective plate stuck to a surface of the mask body facing the liquid-jet head; the reference mark is formed on a surface of the mask body facing the liquid-jet head, or on a surface of the protective plate facing the mask body; a predetermined space is present above the reference mark; and the fixing member is held by the protective plate in direct contact with the fixing member.

In these embodiments, it is also preferable that the protective plate has a smaller area in a plane direction than an area of the mask body, and is stuck to the mask body in a region opposed to the reference mark.

In these embodiments, it is further preferable that the mask comprises a mask body having the reference mark formed inside.

In these embodiments, it is additionally preferable that the mask body has a protrusion formed in a region where the reference mark is formed, the protrusion protruding toward the liquid-jet head.

BRIEF DESCRIPTION OF THE DRAWINGS

The invention will be described with reference to the accompanying drawings, wherein like numbers reference like elements.

DESCRIPTION OF EXEMPLARY EMBODIMENTS

Ink-Jet Recording Head Unit (a Type of Liquid-Jet Head Unit)

Prior to describing an alignment apparatus according to an embodiment of the invention, an explanation will be offered for an example of an ink-jet recording head unit which is a type of liquid-jet head unit having an ink-jet recording head as a type of liquid-jet head targeted by the alignment.

Figure 1:
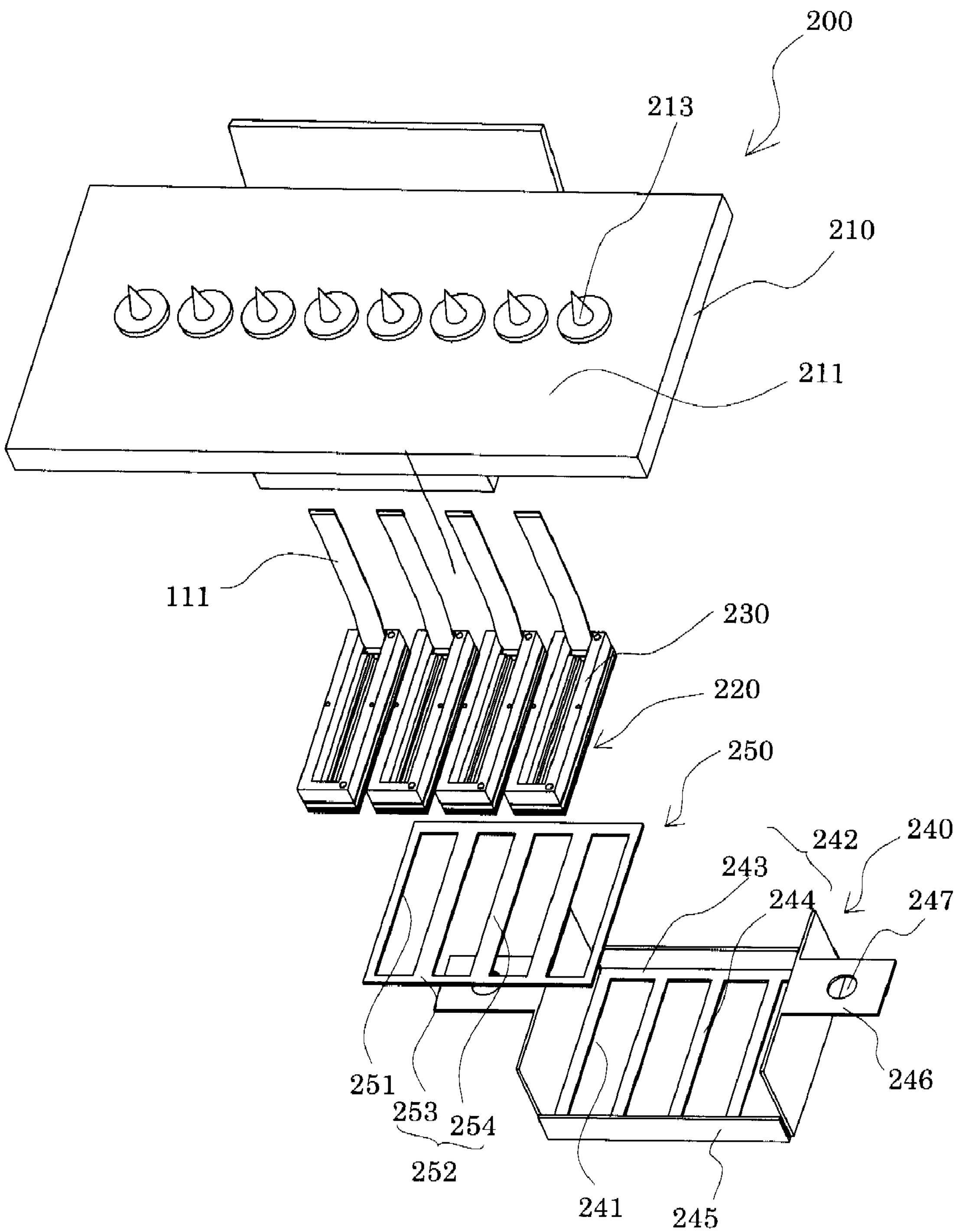
FIG. 1 is an exploded perspective view of a head unit for performing predetermined alignment according to an embodiment of the invention.
Figure 2:
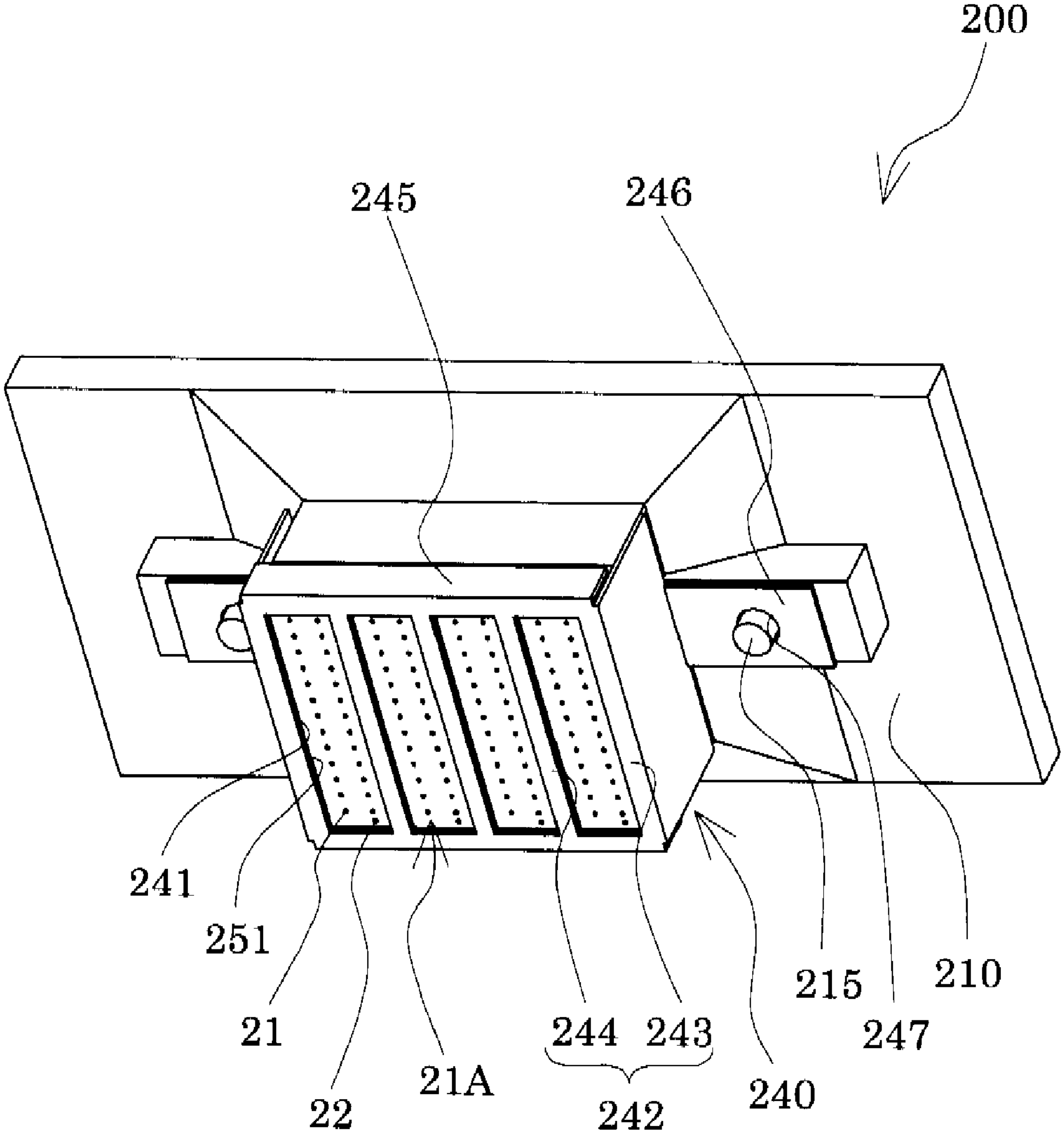
FIG. 2 is a perspective view of the head unit after assembly.
Figure 3:
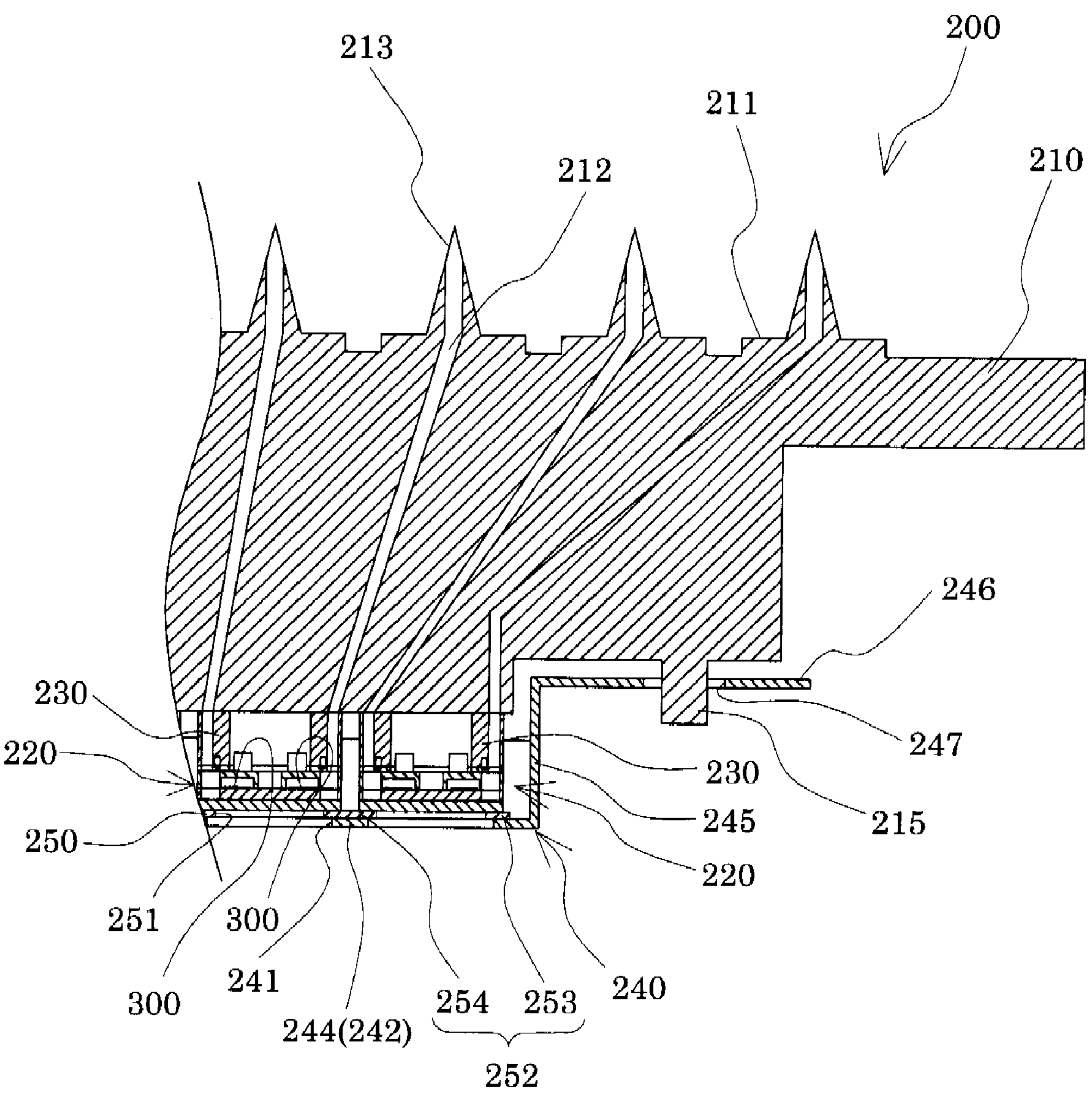
FIG. 3 is a sectional view of essential portions of the head unit.

FIG. 1 is an exploded perspective view of the ink-jet recording head unit. FIG. 2 is a perspective view of the ink-jet recording head unit after assembly. FIG. 3 is a sectional view of essential portions of the ink-jet recording head unit.

As shown in these drawings, an ink-jet recording head unit 200 (to be referred to hereinafter as head unit 200) has a cartridge case 210, an ink-jet recording head 220, a cover head 240, and a fixing plate 250.

Of these members, the cartridge case 210 is a holding member for ink cartridges (not shown), which has a cartridge mounting portion 211 where the ink cartridges are mounted. The ink cartridges are ink supply means which are individually composed and, for example, filled with a black ink and three-color inks. That is, the cartridge case 210 is mounted with the ink cartridges of different colors.

As specified, particularly, in FIG. 3, the cartridge case 210 is provided with a plurality of ink communicating paths 212 each of which has one end opening to the cartridge mounting portion 211, and the other end opening toward a head case 230. To portions of the cartridge mounting portion 211 where the ink communicating paths 212 are open, ink supply needles 213 are fixed which are inserted into ink supply ports of the ink cartridges. This fixing is carried out via filters (not shown) which are formed in the ink communicating paths 212 in order to remove air bubbles or foreign matter within ink.

The head case 230 is secured to the bottom surface of the cartridge case 210. The ink-jet recording head 220 has a plurality of piezoelectric elements 300, and ejects ink droplets through a nozzle orifice 21 at an end surface on a side opposite to the cartridge case 210 by driving of the piezoelectric element 300. A plurality of the ink-jet recording heads 220 are provided in correspondence with the different ink colors so as to eject the different colors of inks from the ink cartridges. A plurality of the head cases 230 are also provided independently in correspondence with the ink-jet recording heads 220.

Figure 4:
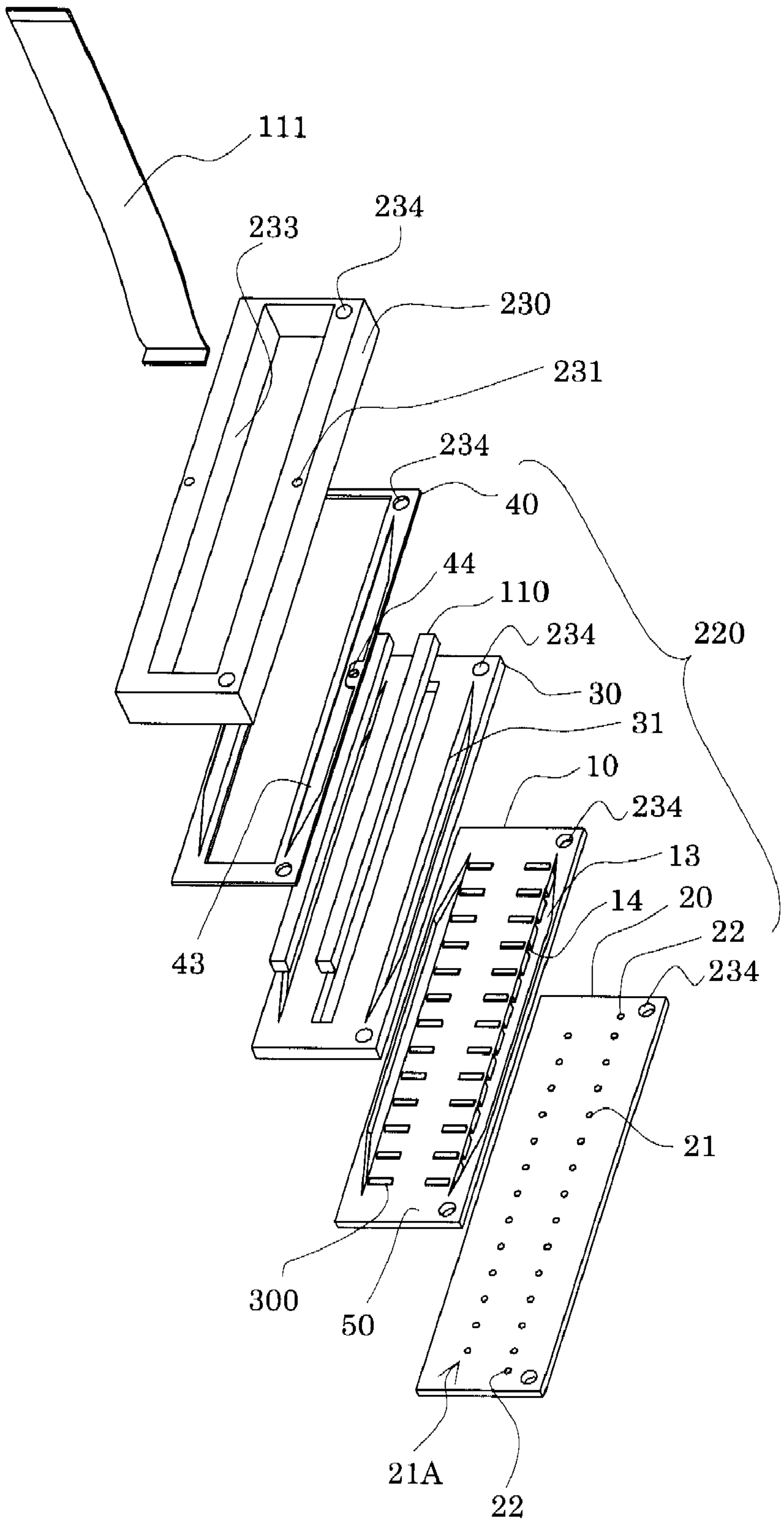
FIG. 4 is an exploded perspective view of the essential parts of the head unit.
Figure 5:
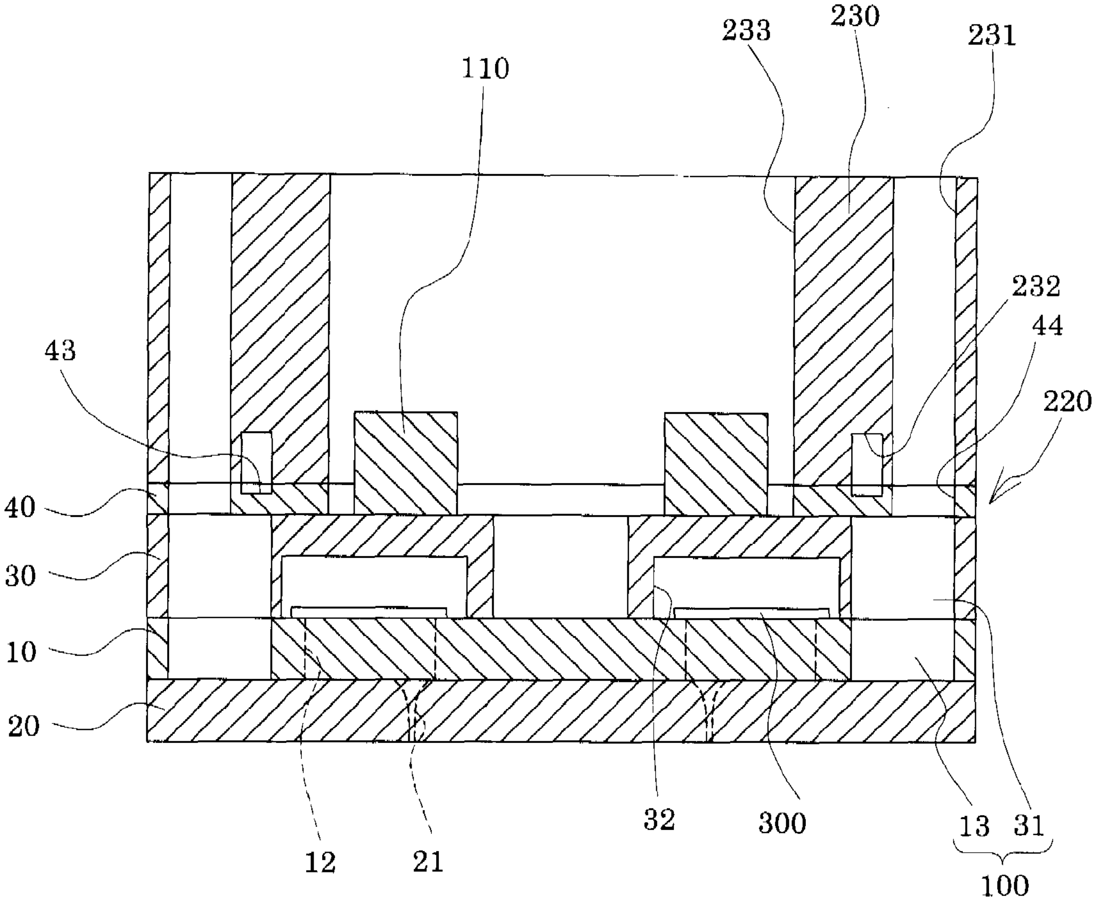
FIG. 5 is a sectional view showing a recording head and a head case of the head unit.

The above-described ink-jet recording head 220 and head case 230 will be described in further detail by additional reference to FIGS. 4 and 5. FIG. 4 is an exploded perspective view of the essential parts of the ink-jet recording head 220 and the head case 230. FIG. 5 is a sectional view of the ink-jet recording head 220 and the head case 230.

As shown in FIGS. 4 and 5, the ink-jet recording head 220 is composed of four plates, i.e., a nozzle plate 20, a passage-forming substrate 10, a protective plate 30, and a compliance plate 40. Of these plates, the passage-forming substrate 10, in the present embodiment, comprises a single crystal silicon substrate, and has an elastic film 50 formed on one surface thereof, the elastic film 50 comprising silicon dioxide formed by thermal oxidation. In the passage-forming substrate 10, pressure generating chambers 12 separated by a plurality of compartment walls are formed. In the present embodiment, two rows of the pressure generating chambers 12 are formed in the width direction of the passage-forming substrate 10. These pressure generating chambers 12 have been created by anisotropic etching performed from the other surface of the passage-forming substrate 10. Longitudinally outwardly of the pressure generating chambers 12 of each row, a communicating portion 13 is formed which communicates with a reservoir portion 31 provided in the protective plate 30 (to be described later) to constitute a reservoir 100 serving as a common ink chamber for the pressure generating chambers 12. The communicating portion 13 is in communication with an end portion in the longitudinal direction of each pressure generating chamber 12 via an ink supply path 14.

The nozzle plate 20 is secured to the opening surface side of the passage-forming substrate 10 via an adhesive agent, a heat-fused film or the like. The nozzle plate 20 has the nozzle orifices 21 each of which communicates with each pressure generating chamber 12 on a side opposite to the ink supply path 14. In the present embodiment, one ink-jet recording head 220 is provided with two nozzle rows 21A comprising two rows of the nozzle orifices 21 arranged parallel.

The nozzle plate 20 can be formed preferably from a glass-ceramics, a single crystal silicon substrate, or a stainless steel which has a thickness, for example, of about 0.01 to 1 mm, and a coefficient of linear expansion, for example, of 2.5 to 4.5 ($10^{-6}$/° C.) at 300° C. or lower. The nozzle plate 20 is provided with an alignment mark 22 (to be described in detail later) which is used for alignment with the fixing plate 250. In the present embodiment, two of the alignment marks 22 are provided at end portions in the parallel-arrangement direction of the nozzle orifices 21.

On the side of the passage-forming substrate 10 opposite from its opening surface, the piezoelectric elements 300 are disposed on the elastic film 50. The piezoelectric elements 300 are formed by sequentially stacking an insulation film 55 comprising zirconium oxide, a lower electrode film comprising a metal, a piezoelectric layer comprising lead zirconate titanate (PZT) or the like, and an upper electrode film comprising a metal.

The protective plate 30 is joined onto the passage-forming substrate 10 on which the piezoelectric elements 300 are formed. The reservoir portion 31, in the present embodiment, is formed to penetrate the protective plate 30 in its thickness direction and to extend in the width direction of the pressure generating chamber 12. As stated earlier, the reservoir portion 31 is brought into communication with the communicating portion 13 of the passage-forming substrate 10 to constitute the reservoir 100 serving as the common ink chamber for the pressure generating chambers 12. In a region of the protective plate 30 opposed to the piezoelectric element 300, a piezoelectric element holding portion 31 is provided which has a space enough not to impede the movement of the piezoelectric element 300. Such a protective plate 30 can be suitably formed from glass, ceramic, metal, or plastic, but it is preferred to use a material having nearly the same thermal expansion coefficient as that of the passage-forming substrate 10. In the present embodiment, the protective plate 30 is formed using a single crystal silicon substrate which is the same material as that of the passage-forming substrate 10.

A drive IC 110 for driving each piezoelectric element 300 is provided on the protective plate 30. Each terminal of the drive IC 110 is connected to lead-out wiring withdrawn from an individual electrode of each piezoelectric element 300 via a bonding wire or the like (not shown). Each terminal of the drive IC 110 is connected to the outside via external wiring 111, such as a flexible printed cable (FPC), as shown in FIG. 1 to receive various signals, such as a print signal, from the outside via the external wiring 111.

The compliance plate 40 is joined onto the protective plate 30. In a region of the compliance plate 40 opposed to the reservoir 100, an ink introducing port 44 for supplying ink to the reservoir 100 is formed to penetrate the compliance plate 40 in its thickness direction. A region, other than the ink introducing port 44, in the region of the compliance plate 40 opposed to the reservoir 100 defines a flexible portion 43 formed thinly in the thickness direction. The reservoir 100 is sealed with the flexible portion 43. The flexible portion 43 imparts compliance to the interior of the reservoir 100. In more detail, the head case 230 having ink supply communicating paths 231 is provided on the compliance plate 40. In the head case 230, a depression 232 is formed in a region opposed to the flexible portion 43 so that flexible deformation of the flexible portion 43 takes place, as appropriate.

In the head case 230, a drive IC holding portion 233 penetrating the head case 230 in the thickness direction is provided in a region opposed to the drive IC 110 provided on the protective plate 30. The external wiring 111 is inserted through the drive IC holding portion 233, and connected to the drive IC 110.

With the ink-jet recording head 220 of the above-described configuration, ink from the ink cartridge is taken in through the ink introducing port 44 via the ink communicating path 212 (see FIG. 3) and the ink supply communicating path 231, filling up the interior of the head ranging from the reservoir 100 to the nozzle orifices 21. Then, according to recording signals from the drive IC 110, voltage is applied to the respective piezoelectric element 300 corresponding to the pressure generating chamber 12 to flexibly deform the elastic film 50 and the piezoelectric element 300. As a result, the pressure inside the pressure generating chamber 12 rises to eject ink droplets through the nozzle orifice 21.

The respective members constituting the ink-jet recording head 220, and the head case 230 are provided with pin insertion holes 234, at two locations of corner portions thereof, for insertion of pins for positioning the respective members during assembly. By inserting the pins into the pin insertion holes 234 to position the respective members relatively, while joining the members to each other, the ink-jet recording head 220 and the head case 230 are combined integrally.

The above-mentioned ink-jet recording head 220 is formed by forming many chips simultaneously on a single silicon wafer, adhering them to the nozzle plate 20 and the compliance plate 40 to integrate these members, and then dividing the composite for each passage-forming substrate 10 of one chip size as shown in FIG. 4.

Four of the ink-jet recording heads 220 and 4 of the head cases 230 are fixed to the cartridge case 210 with predetermined spacing in the direction of parallel arrangement of the nozzle rows 21A, as shown in FIGS. 1 to 3. That is, the head unit 200 is provided with 8 of the nozzle rows 21A.

As described above, there are provided many of the nozzle rows 21A comprising rows of the nozzle orifices 21 arranged parallel using the plurality of the ink-jet recording heads 220. By so doing, a decrease in yield can be prevented in comparison with the formation of many of the nozzle rows 21A in the single ink-jet recording head 220. Furthermore, the plurality of ink-jet recording heads 220 are used to achieve the arrangement of the multiple nozzle rows 21A. By so doing, it becomes possible to increase the yield of the ink-jet recording heads 220 which can be formed from the single silicon wafer. This can narrow the wasteful region of the silicon wafer to cut down on the cost of production.

The above four ink-jet recording heads 220 are positioned and held by the fixing plate 250, which is the common fixing member joined to the ink droplet ejection surfaces of the plural ink-jet recording heads 220, as shown in FIGS. 1 and 3. The fixing plate 250 comprises a flat plate, and has an exposure opening portion 251 which exposes the nozzle orifices 21, and a joining portion 252 which demarcates the exposure opening portion 251 and which is joined at least to opposite end portions of the nozzle rows 21A on the ink droplet ejection surface of the ink-jet recording head 220.

The joining portion 252 is composed of a fixing frame portion 253 provided along the outer periphery of the ink droplet ejection surfaces of the plural ink-jet recording heads 220, and a fixing beam portion 254 extending between the adjacent ink-jet recording heads 220 to divide the exposure opening portion 251. The joining portion 252 comprising the fixing frame portion 253 and the fixing beam portion 254 is joined altogether to the ink droplet ejection surfaces of the plural ink-jet recording heads 220. The fixing frame portion 253 of the joining portion 252 is formed to close the pin insertion holes 234 which position the respective members during manufacture of the ink-jet recording head 220.

The suitable material for the fixing plate 250 is, for example, a metal such as stainless steel, glass-ceramics, or a single crystal silicon plate. For the fixing plate 250, it is preferred to use a material having the same thermal expansion coefficient as that of the nozzle plate 20 in order to prevent deformation due to the difference in thermal expansion from the nozzle plate 20. For example, when the nozzle plate 20 is formed from a single crystal silicon plate, it is preferred to form the fixing plate 250 from a single crystal silicon plate.

The fixing plate 250 is preferably formed thinly, desirably more thinly than the cover head 240 to be described later. If the fixing plate 250 is thick, ink is apt to remain, for example, between the ink droplet ejection surface of the nozzle plate 20 and the fixing beam portion 254 when the ink droplet ejection surface is wiped. However, the fixing plate 250 is formed thinly, whereby ink can be prevented from remaining on the ink droplet ejection surface of the nozzle plate 20 during wiping.

In the present embodiment, the thickness of the fixing plate 250 is set at 0.1 mm. The joining between the fixing plate 250 and the nozzle plate 20 is not limited, and can be performed suitably, for example, using a thermosetting epoxy-based adhesive agent, or an ultraviolet curing adhesive agent.

As noted above, the fixing plate 250 closes the sites between the adjacent ink-jet recording heads 220 by its fixing beam portion 254. Thus, ink does not enter the sites between the adjacent ink-jet recording heads 220, and this can prevent ink-associated deterioration and destruction of the members of the ink-jet recording head 220, such as the piezoelectric element 300 and the drive IC 110. Moreover, the ink droplet ejection surface of the ink-jet recording head 220 and the fixing plate 250 are adhered together, without clearance, by the adhesive agent. Thus, the entry of a recording medium into the clearance, if any, can be prevented to prevent deformation of the fixing plate 250 and a paper jam.

As seen above, the above head unit 200 has the four ink-jet recording heads 220 secured to the fixing plate 250. Positioning of the ink-jet recording head 220 onto the fixing plate 250 is performed using an alignment apparatus to be described later.

Further, the head unit 200 is provided with the cover head 240, which is box-shaped to cover the respective ink-jet recording heads 220, on a side of the fixing plate 250 opposite from the ink-jet recording head 220, as shown in FIGS. 1 and 2. The cover head 240 has a fixing portion 242 provided with an opening portion 241 in correspondence with the exposure opening portion 251 of the fixing plate 250, and a side wall portion 245 provided on the lateral side of the ink droplet ejection surfaces of the ink-jet recording heads 220 so as to bend around the outer periphery of the fixing plate 250.

The fixing portion 242 is composed of a frame portion 243 provided in correspondence with the fixing frame portion 253 of the fixing plate 250, and a beam portion 244 provided in correspondence with the fixing beam portion 254 of the fixing plate 250 to divide the opening portion 241. The fixing portion 242 comprising the frame portion 243 and the beam portion 244 is joined to the joining portion 252 of the fixing plate 250. However, the beam portion 244 may be omitted.

As noted above, the ink droplet ejection surface of the ink-jet recording head 220 and the cover head 240 are joined together without clearance. Thus, the entry of a recording medium into the clearance, if any, can be prevented to prevent deformation of the cover plate 240 and a paper jam. Moreover, the side wall portion 245 of the cover head 240 covers the outer peripheral edge portion of the plural ink-jet recording heads 220, thus reliably preventing the wraparound of ink onto the side surface of the ink-jet recording head 220.

Examples of the material for the cover head 240 are metallic materials such as stainless steel. The cover head 240 may be formed by press working or molding a plate of such a metal. Also, the cover head 240 can be grounded if it is formed of an electroconductive metallic material.

Furthermore, the cover head 240 needs a certain degree of strength in order to protect the ink-jet recording head 220 from impact by wiping or capping. Thus, the cover head 240 needs to be relatively thick. In the present embodiment, the thickness of the cover head 240 is set at 0.2 mm.

The method of joining between the cover head 240 and the fixing plate 250 is not limited, and is, for example, adhesion using a thermosetting epoxy-based adhesive agent.

The fixing portion 242 is provided with a flange portion 246 having fixing holes 247 for positioning and fixing the cover head 240 onto other member. The flange portion 246 is provided to bend so as to protrude from the side wall portion 245 in the same direction as the plane direction of the ink droplet ejection surface. The cover head 240 in the present embodiment is fixed to the cartridge case 210, which is the holding member holding the ink-jet recording heads 220 and the head cases 230, as shown in FIGS. 2 and 3.

In further detail, as shown in FIGS. 2 and 3, the cartridge case 210 is provided with protrusions 215 which protrude on the ink droplet ejection surface side and which are inserted into the fixing holes 247 of the cover head 240. By inserting the protrusions 215 into the fixing holes 247 of the cover head 240 and heating and caulking leading end portions of the protrusions 215, the cover head 240 is fixed to the cartridge case 210. The protrusion 215 provided on the cartridge case 210 is allowed to have a smaller outer diameter than that of the fixing hole 247 of the flange portion 246, whereby the cover head 240 can be positioned in the plane direction of the ink droplet ejection surface and fixed to the cartridge case 210.

The cover head 240 and the fixing plate 250 having the plurality of ink-jet recording heads 220 joined thereto are fixed together, with the fixing holes 247 of the cover head 240 and the plurality of nozzle rows 21A being positioned with respect to each other. This positioning between the fixing holes 247 of the cover head 240 and the plurality of nozzle rows 21A can also be performed using the alignment apparatus to be described later. Alternatively, when the fixing plate 250 and the plurality of ink-jet recording heads 220 are positioned and fixed, the cover head 240 may simultaneously be positioned and fixed.

EMBODIMENT

The alignment apparatus according to an embodiment of the invention will be described in detail with reference to the accompanying drawings. The same portions as those in FIGS. 1 to 5 are assigned the same numerals as those therein.

Figure 6:
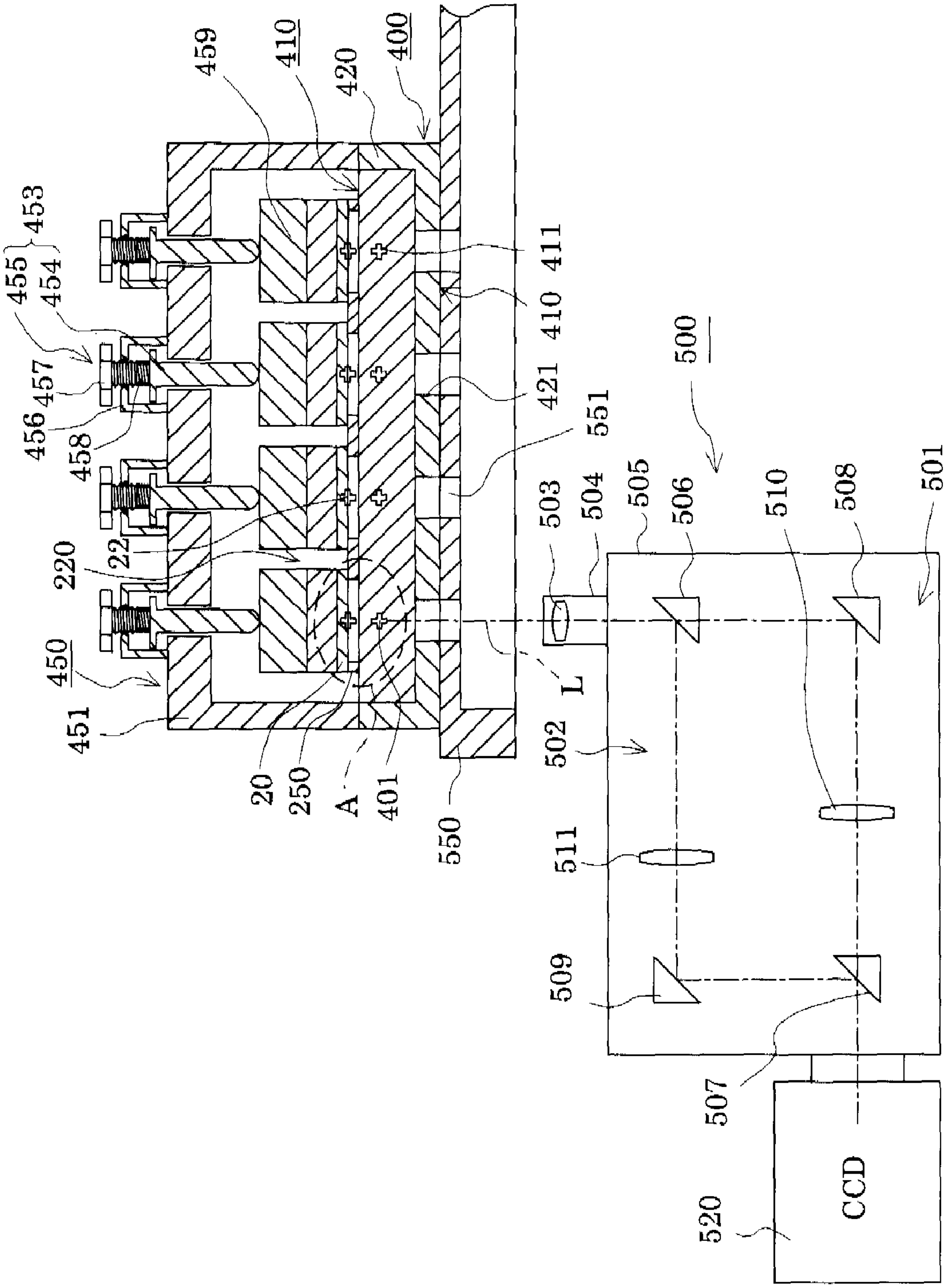
FIG. 6 is a sectional view showing an alignment apparatus according to the embodiment of the invention.

FIG. 6 is a sectional view showing the alignment apparatus according to the embodiment of the invention. As shown in this drawing, the alignment apparatus according to this embodiment has an alignment jig 400 on which the ink-jet recording heads 220 as objects to be aligned are placed, a pressing means 450 for pressing the ink-jet recording heads 220 against the fixing plate 250 integrally with the alignment jig 400, and a bifocal microscope 500 having an optical system for observing the ink-jet recording head 220 from below the alignment jig 400 via the alignment jig 400.

Of these members, the alignment jig 400 has a mask 410 provided with reference marks 401, and a base jig 420 for setting the mask 410 in place. The mask 410 comprises a material having transparency, for example, glass such as quartz, and the reference marks 401 are formed within the mask 410. A concrete explanation, such as an explanation for the method of forming the reference mark 401, will be offered in detail later. The mask 410 is adapted to be attracted and fixed to the base jig 420, for example, by applying a negative pressure from the base jig 420, although this is not explicitly shown in the drawing.

In the present embodiment, the reference marks 401 are provided within the mask 410, as mentioned above. Thus, even if an external force acts on the surface of the mask 410, the reference marks 401 are free from chipping or scarring. This is because the surface layer of the mask 410 functions as a protective layer for the reference marks 401.

Since the reference marks 401 are located at some depth from the surface of the mask 410, moreover, a predetermined distance is ensured between the reference mark 401 and the alignment mark 22. Hence, the zone ranging from the position of the mask 410, where the reference mark 401 exists, to the surface of the mask 410 can function as a substantial spacer. Thus, the fixing plate 250 is held in direct contact with the mask 410.

In the above configuration, the fixing plate 250 is held on the mask 410, and the relative positional relationship between the reference mark 401 and the alignment mark 22 of the nozzle plate 20 is confirmed by the bifocal microscope 500. During this process, alignment between the reference mark 401 and the alignment mark 22 is performed, while the fixing plate 250 and the nozzle plate 20 of the ink-jet recording head 220 are adhered together via the adhesive agent.

The base jig 420 comprises stainless steel or the like in the shape of a box opening at the bottom surface. In the base jig 420, a single through-hole 421 penetrating in the thickness direction is provided in a region opposed to the region of the mask 410 where the reference mark 401 is provided.

The mask 410 is detachably held by the base jig 420, and can be used in other alignment jig, for example, when the fixing plate 250 and the ink-jet recording head 220 are adhered involving curing. This can cut down on the cost for the alignment jig 400.

The pressing means 450 for pressing the ink-jet recording head 220 toward the fixing plate 250 is disposed on the above-mentioned alignment jig 400. That is, the pressing means 450 has a U-shaped arm portion 451 having both ends placed on the base jig 420 and arranged above the ink-jet recording heads 220, and pressing portions 453 provided in the arm portion 451 for pressing the ink-jet recording heads 220 toward the fixing plate 250.

The pressing portions 453 are provided in regions of the arm portion 451 opposed to the respective ink-jet recording heads 220. In the present embodiment, four of the ink-jet recording heads 220 are fixed to the single fixing plate 250. Thus, four (the same number as the number of the ink-jet recording heads 220) of the pressing portions 453 are provided in agreement with the ink-jet recording heads 220.

Each pressing portion 453 is composed of a pressing pin 454 of a cylindrical shape inserted through the arm portion 451 and provided movably in the axial direction, an urging means 455 provided on a proximal end side of the pressing pin 454 for urging the pressing pin 454 toward the ink-jet recording head 220, and a pressing dowel 459 placed between the pressing pin 454 and the ink-jet recording head 220.

The pressing pin 454 has a leading end formed in a semi-spherical shape, which makes a point contact with the top of the pressing dowel 459 to press the pressing dowel 459.

The urging means 455 is provided on the arm portion 451 for urging the pressing pin 454 toward the ink-jet recording head 220. In the present embodiment, the urging means 455 has a thread holding portion 456 provided to surround the proximal end side of the pressing pin 454, a threaded portion 457 screwed to the thread holding portion 456, and an urging spring 458 provided between the leading end surface of the threaded portion 457 and a proximal end portion of the pressing pin 454.

Thus, the urging means 455 can adjust the pressure with which the urging spring 458 presses the pressing pin 454, depending on the amount of clamping against the thread holding portion 456 by the threaded portion 457. By this means, the pressure with which the pressing pin 454 presses the pressing dowel 459 can be adjusted.

The pressing dowel 459 is placed between the pressing pin 454 and the protective plate 30 of the ink-jet recording head 220. The pressing pin 454 makes a point contact with the upper surface of the pressing dowel 459, and the pressing force of the pressing pin 454 is spread uniformly to nearly the entire surface of the protective plate 30 of the ink-jet recording head 220. In this state, the ink-jet recording head 220 can be pressed. Instead of bringing the leading end of the pressing pin 454 into direct contact with the top of the protective plate 30 of the ink-jet recording head 220, the whole of the ink-jet recording head 220 is pressed by the pressing dowel 459. Thus, the ink-jet recording head 220 can be reliably fixed to the fixing plate 250. The pressing dowel 459 has an outer peripheral shape of the same size as, or a slightly smaller size than, the size of the outer peripheral shape of the protective plate 30 of the ink-jet recording head 220.

As described above, the alignment jig 400 integrated with the pressing means 450 is disposed on a moving table 550, and is designed to be moved, as appropriate, in a horizontal direction perpendicular to the optical axis L of the bifocal microscope 500. Thus, the moving table 550 is moved, with the optical axis L being fixed. By so doing, each alignment mark 22 corresponding to each ink-jet recording head 220 can be allowed to lie on the optical axis L together with each reference mark 401. In a region of the moving table 550 where the optical axis L passes while heading for the mask 410, a through-hole 551 is provided to ensure an optical path leading to the alignment mark 22 via the reference mark 401.

The bifocal microscope 500 has one optical system 501 and another optical system 502 having the optical axis L in common. The optical axis L is pointed in the direction of the alignment mark 22 (in the vertical direction in the drawing) via the reference mark 401 and a communicating hole 432, as a space, from the side of the mask 410 opposite to the spacer jig. The optical system 501 can focus on the reference mark 401, while the optical system 502 can focus on the alignment mark 22.

In more detail, an objective lens 503 is accommodated in a lens-barrel 504, with the optical axis L being pointed in the direction of the reference mark 401 and the alignment mark 22. The lens-barrel 504 is fixed to a casing 505. Within the casing 505, two beam splitters 506 and 507, two mirrors 508 and 509, and two focal lenses 510 and 511 are accommodated.

The optical system 501 is formed from the beam splitter 506, the mirror 508, the focal lens 510, and the beam splitter 507. The optical system 501 has an optical path (indicated by dashed dotted lines in the drawing) in which light, which has passed through the beam splitter 506, is reflected by the mirror 508, passed through the focal lens 510, and then led to the outside via the beam splitter 507.

The optical system 502 is formed from the beam splitter 506, the focal lens 511, the mirror 509, and the beam splitter 507. The optical system 502 has an optical path (indicated by dashed dotted lines in the drawing) in which light, which is reflected by the beam splitter 506, is passed through the focal lens 511, then reflected by the mirror 509 and the beam splitter 507, and then led to the outside.

A CCD 520, which is an imaging means, takes in an image of the reference mark 401 and an image of the alignment mark 22 simultaneously via the optical systems 501 and 502, and reproduces the images. By adjusting the focal position of the focal lens 510, the image of the reference mark 401 is focused onto the CCD 520. By adjusting the focal position of the focal lens 511, the image of the alignment mark 22 is focused onto the CCD 520. In this manner, clear images of the reference mark 401 and the alignment mark 22 can be focused individually on the CCD 520. The position of the ink-jet recording head 220 is adjusted such that these images overlap, whereby predetermined alignment is carried out.

According to the present embodiment, as described above, the reference mark 401 and the alignment mark 22 can be seen at the same time using the bifocal microscope 500. Thus, predetermined positioning can be performed by superimposing the image of the reference mark 401 and the image of the alignment mark 22 individually focused by the one optical system 501 and the other optical system 502. That is, the depth of field of each of the optical systems 501 and 502 can be minimized, and the magnification can be increased accordingly.

For this reason as well, predetermined positioning of the nozzle plate 20 can be performed highly accurately.

In the present embodiment, the reference mark 401 is located at some depth below the surface of the mask 410, as mentioned above. Thus, a predetermined distance is ensured between the reference mark 401 and the alignment mark 22. Hence, the zone ranging from the position of the mask 410, where the reference mark 401 exists, to the surface of the mask 410 functions as a substantial spacer. As a result, the reference mark 401 and the alignment mark 22 are spaced from each other. If the reference mark 401 and the alignment mark 22 are to be observed simultaneously with a single optical system, one of the marks is in focus, but the other mark is out of focus. Consequently, the problem is caused that the depth of field of the optical system has to be increased at the sacrifice of the magnification. This problem becomes pronounced as the reference mark 401 is rendered finer.

Three concrete examples will be explained as working examples, including the method of preparing the above mask 410. FIGS. 7A, 7B, FIGS. 8A, 8B, and FIGS. 9A, 9B show the portion A of FIG. 6 in an extracted and enlarged manner.

First Example

Figure 7A:
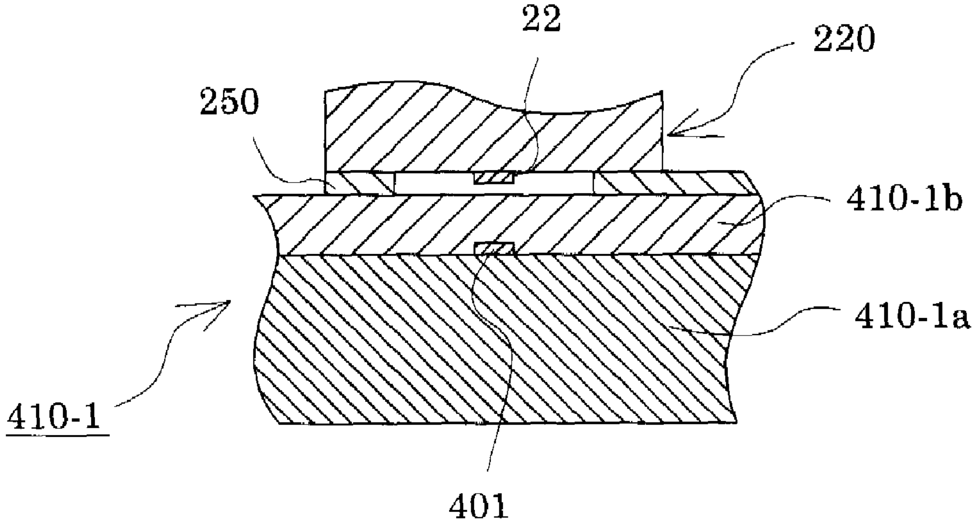
FIGS. 7A and 7B are explanation drawings showing a first example of a mask of the alignment apparatus.
Figure 7B:
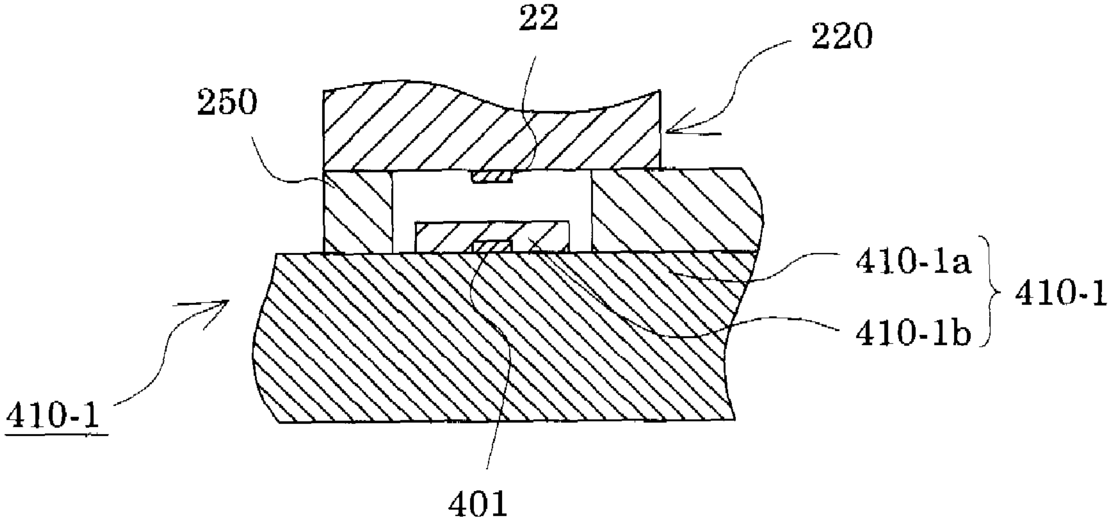

FIGS. 7A and 7B are explanation drawings showing a first example of the mask 410 of the above-described alignment apparatus. As shown in FIG. 7A, a mask 410-1 according to the present example has a mask body 410-1*a*, and a protective plate 410-1*b* stuck to the surface of the mask body 410-1*a* facing the ink-jet recording head 220. The reference mark 401 is provided at the boundary between the mask body 410-1*a* and the protective plate 410-1*b*. Concretely, FIGS. 7A and 7B show that the reference mark 401 is provided on the surface of the mask body 410-1*a* facing the ink-jet recording head 220.

However, the reference mark 401 may be provided on the surface of the protective plate 410-1*b* facing the mask body 410-1*a*.

Thus, the reference mark 401 is protected by the mask body 410-1*a* and the protective plate 410-1*b*. The reference mark 401 is formed within the mask 410-1 so as to be prevented from chipping or scarring. The reference mark 401 may be formed by sputtering chromium, and the reference mark 401 can be formed in the mask 410-1 easily and high accurately.

As shown in FIG. 7B, the protective plate 410-1*b* is stuck to the surface of the mask body 410-1*a* facing the ink-jet recording head 220 with the use of an adhesive agent (binder) to set the area in the plane direction of the protective plate 410-1*b* at a value smaller than the area in the plane direction of the mask body 410-1*a*. Here, the protective plate 410-1*b* is stuck to the mask body 410-1*a* so as to be opposed to the region where the reference mark 401 is formed.

The mask body 410-1*a* contacts the fixing plate 250, and thus cannot access the ink-jet recording head 220. On the other hand, the protective plate 410-1*b* can enter inside the frame of the fixing plate 250. Thus, the mask 410-1 can be brought close to the ink-jet recording head 220. Accordingly, alignment of higher accuracy can be performed.

Second Example

Figure 8A:
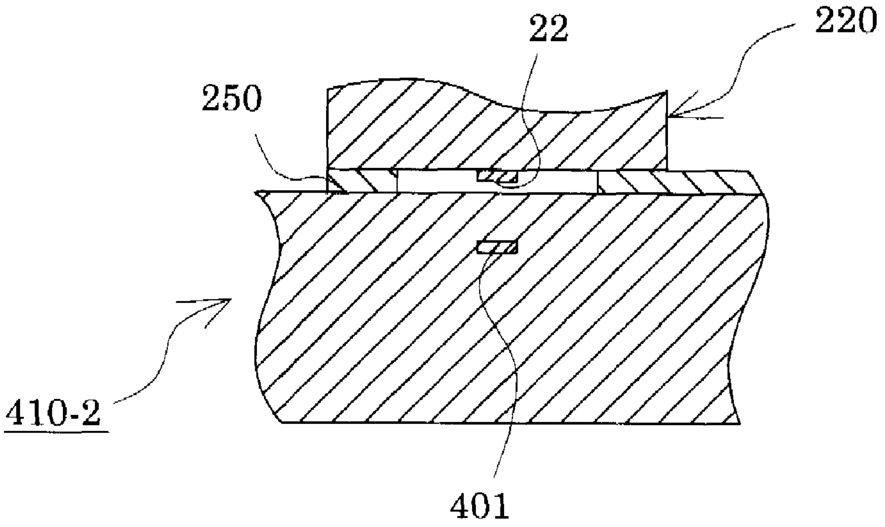
FIGS. 8A and 8B are explanation drawings showing a second example of the mask of the alignment apparatus.
Figure 8B:
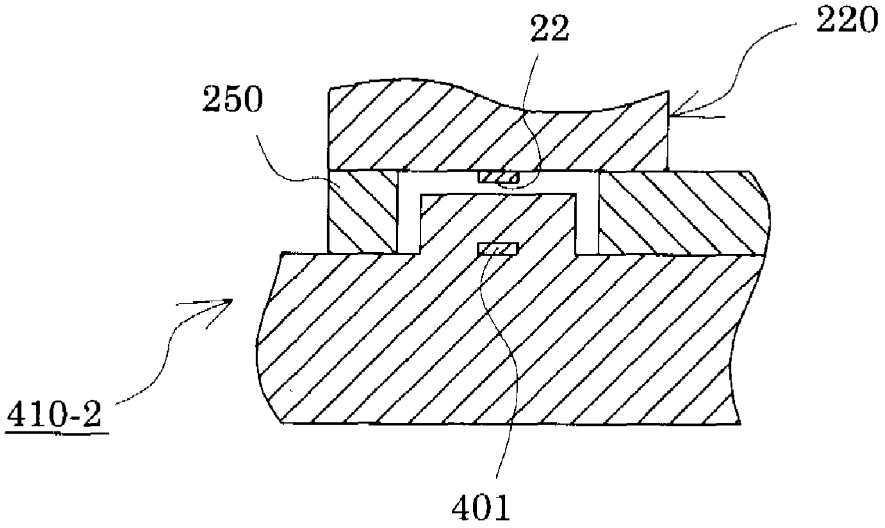

FIGS. 8A and 8B are explanation drawings showing a second example of the mask 410 of the above-described alignment apparatus. The configuration of the ink-jet recording head 220 in the second example is not different from that of the first example. As shown in FIGS. 8A and 8B, a mask 410-2 in the present example is different from the equivalent in the first example, and is configured such that the protective plate is not provided, and the reference mark 401 is formed within the mask body itself by laser such as stealth laser or femto laser. Laser technology can form the reference mark 401 with high accuracy, thus making it easy to confirm the reference mark 401. However, the method of formation is not limited to laser, and any other method may be used, as long as the reference mark 401 can be formed within the mask body thereby.

Thus, the reference mark 401 can be easily formed at a desired depth position within the mask 410-2. Coupled with the ease of microfabrication, the method of this example can fully and easily achieve miniaturization of the reference mark 401 associated with high magnification of the optical systems 501 and 502.

In FIG. 8A, the mask body constituting the mask 410-2 is formed of a flat plate. As shown in FIG. 8B, however, there may be formed a protrusion of the surface of the mask body constituting the mask 410-2, the surface facing the ink-jet recording head 220, and the protrusion may be advanced into the frame of the fixing plate 250. By so doing, the mask 410-2 can be brought close to the ink-jet recording head 220, so that alignment of higher accuracy can be performed.

Third Example

Figure 9A:
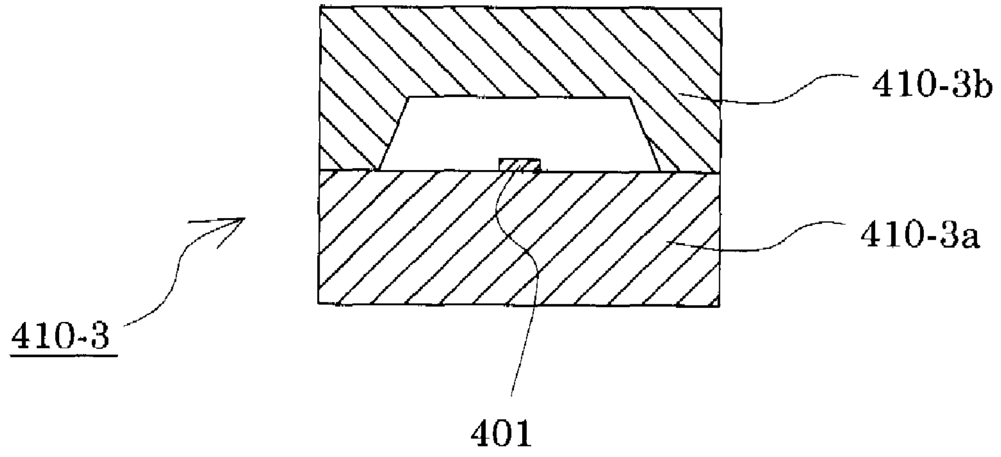
FIGS. 9A and 9B are explanation drawings showing a third example of the mask of the alignment apparatus.
Figure 9B:
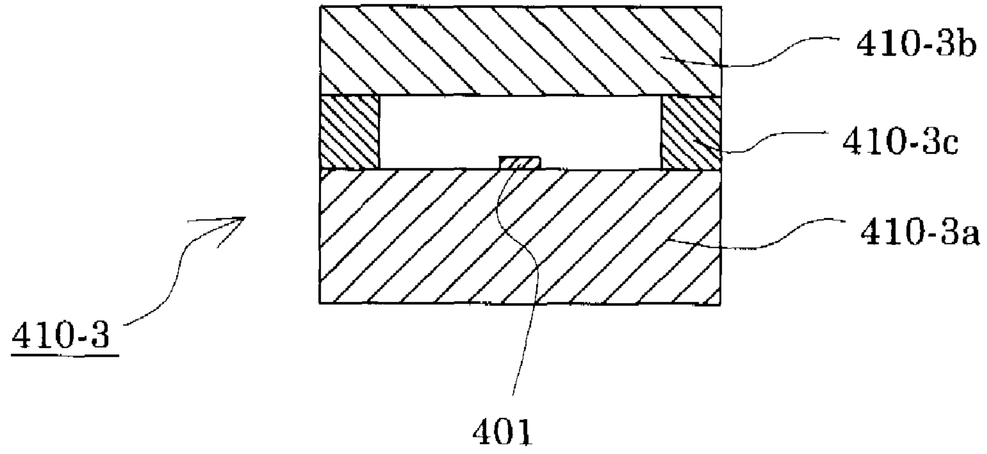

FIGS. 9A and 9B are explanation drawings showing a third example of the mask 410 of the above-described alignment apparatus. The configuration of the ink-jet recording head 220 in the third example is not different from those of the first and second examples. As shown in FIGS. 9A and 9B, a mask 410-3 according to the present example has the reference mark 401 formed on the surface of a mask body 410-3*a* facing the ink-jet recording head 220, and has a predetermined space above the reference mark 401. Instead of providing the reference mark 401 on the surface of the mask body 410-3*a* facing the ink-jet recording head 220, it is permissible to provide the reference mark 401 on the surface of a protective plate 410-3*b* facing the mask body 410-3*a*, although this is not illustrated.

In FIG. 9A, the reference mark 401 is provided on the surface of the mask body 410-3*a* facing the ink-jet recording head 220, and a depression is provided in the protective plate 410-3*b* so that a predetermined space is formed above the reference mark 401.

In FIG. 9B, a spacer member 410-3*c* is provided in a region between the mask body 410-3*a* and the protective plate 410-3*b* where the reference mark 401 is not formed, whereby a predetermined space is formed above the reference mark 401.

The adoption of such configurations can avoid the disadvantage that the adhesive agent used when sticking the mask body 410-3*a* and the protective plate 410-3*b* touches the reference mark 401 to present difficulty in confirming the reference mark 401 because of adhesion irregularity.

It goes without saying that in the third example as well, the area in the plane direction of the protective plate 410-3*b* may be smaller than the area in the plane direction of the mask body 410-3*a*, as shown in FIG. 7B illustrating the first example and FIG. 8B illustrating the second example.

Method of Alignment

Next, an explanation will be offered for the method of aligning the ink-jet recording head 220 with a predetermined position with the use of the above-described alignment apparatus.

Figure 10A:
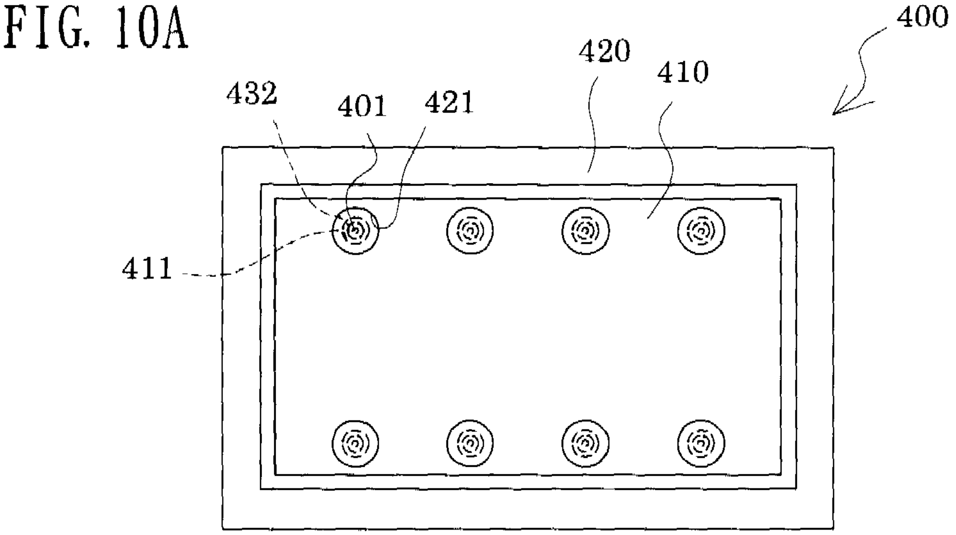
FIGS. 10A to 10C are bottom views for illustrating a positioning method using the alignment apparatus.
Figure 10B:
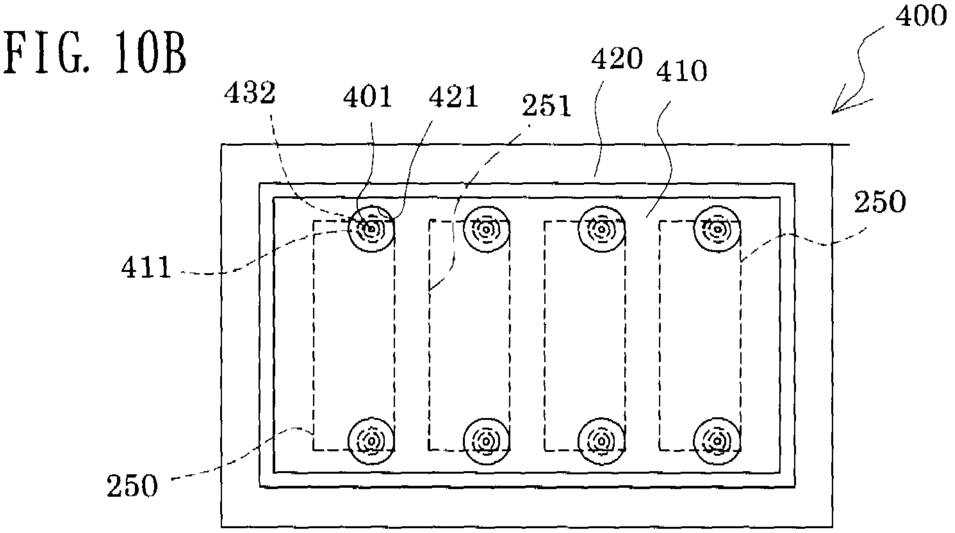
Figure 10C:
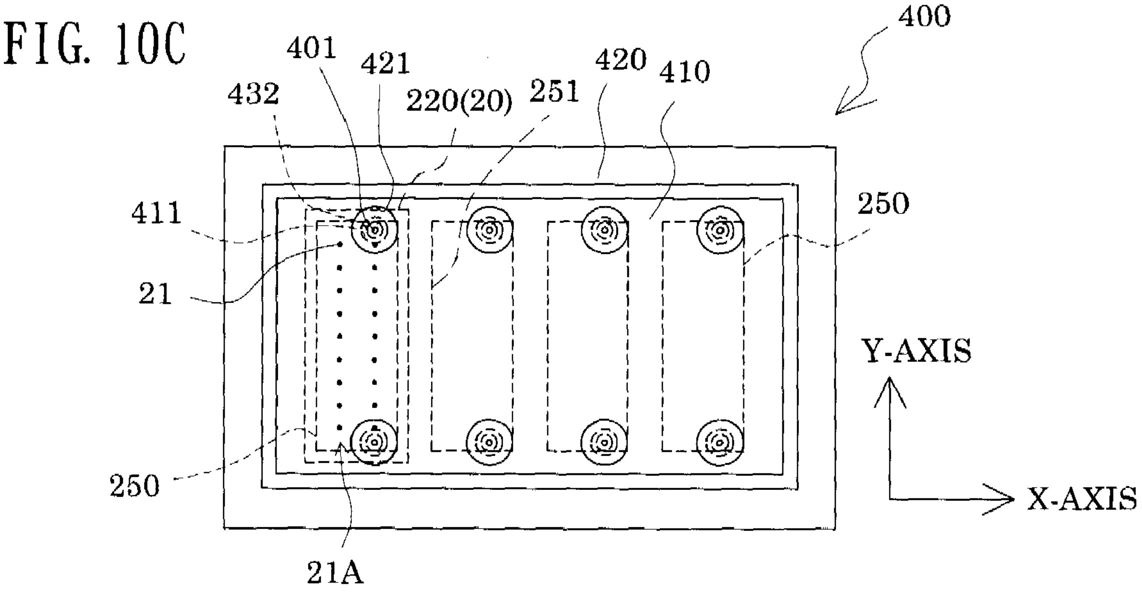

FIGS. 10A to 10C are bottom views showing the status of the alignment jig 400, when viewed from the bottom surface side, during alignment of the ink-jet recording head 220.

1) As shown in FIG. 10A, the reference mark 401 is confirmed by the bifocal microscope 500 from the bottom surface side of the alignment jig 400.

2) As shown in FIG. 10B, the fixing plate 250 is held by the alignment jig 400. This is done by placing and fixing the fixing plate 250 on the upper surface of the mask 410.

3) In the optical system 501 of the bifocal microscope 500, an image of the reference mark 401 is focused by the adjustment of the focal lens 510, and taken into the CCD 520. In the other optical system 502, an image of the alignment mark 22 is focused by the adjustment of the focal lens 511, and taken into the CCD 520. As a result, clear images focused on the reference mark 401 and the alignment mark 22 are incorporated into the CCD 520. That is, the optical systems 501 and 502 have the optical axis L in common, but can focus individually on the objects at different positions (i.e., reference mark 401 and alignment mark 22). Thus, they obtain clear images of the reference mark 401 and the alignment mark 22 at sufficient magnification with decreased depths of field.

4) As shown in FIG. 10C, the ink-jet recording head 220 and the fixing plate 250 are brought into contact via the adhesive agent. That is, based on the images of the reference mark 401 and the alignment mark 22 obtained in the step 3) above, the position of the ink-jet recording head 220 is adjusted such that the alignment mark 22 is superimposed on the reference mark 401, and also the ink-jet recording head 220 is brought into contact with the fixing plate 250 via the adhesive agent.

The fixing plate 250 is positioned and held by the alignment jig 400. Thus, the mask 410 and the ink-jet recording head 220 are positioned with respect to each other, whereby the fixing plate 250 and the ink-jet recording head 220 can also be positioned with respect to each other.

Positioning of the ink-jet recording head 220 with respect to the fixing plate 250 may be performed by fine positional adjustment using a micrometer or the like (not shown) while an operator is visually recognizing the images on the CCD 520. Alternatively, the positioning may be performed automatically by subjecting the output image of the CCD 520 to image processing to drive the micrometer or the like by a drive motor or the like.

5) The same step as the step in 4) above (FIG. 10C) is repeated to position the plurality of ink-jet recording heads 220 on the fixing plate 250 sequentially. That is, with the optical axis L being fixed, the moving table 550 is moved in a horizontal plane in the Y-axis direction in FIG. 10C, whereby the other alignment mark 22 of the same ink-jet recording head 220 is aligned with the reference mark 401. Also, the moving table 550 is moved in the horizontal plane in the X-axis direction in FIG. 10C, whereby the alignment mark 22 of the adjacent other ink-jet recording head 220 is aligned with the reference mark 401.

6) The plurality of ink-jet recording heads 220 are pressed against the fixing plate 250 at a predetermined pressure by means of the pressing means 450, with the adhesive agent being cured, whereby the ink-jet recording heads 220 are joined to the fixing plate 250.

By so joining the fixing plate 250 and the plurality of ink-jet recording heads 220, while performing positioning, the fixing plate 250 and the nozzle rows 21A can be positioned with respect to each other with high accuracy. Moreover, the relative positioning of the nozzle rows 21A of the adjacent ink-jet recording heads 220 can be carried out highly accurately. Furthermore, the ink-jet recording head 220 is contacted with and joined to the fixing plate 250 comprising the flat plate. Thus, simply by joining the ink-jet recording head 220 to the fixing plate 250, the relative positioning in the ink droplet ejection direction of the plurality of ink-jet recording heads 220 is performed. Hence, there is no need to align the ink droplet ejection position of the plurality of ink-jet recording heads 220, and deviation in the landing position of ink droplets can be prevented reliably.

In the present embodiment, in particular, the distance exists between the reference mark 401 and the alignment mark 22 because the reference mark 401 is provided within the mask 410. Thus, the height positions of the reference mark 401 and the alignment mark 22 are different from each other. However, the focuses of the reference mark 401 and the alignment mark 22 can be adjusted, respectively, by the two optical systems 501 and 502. Consequently, the images of the reference mark 401 and the alignment mark 22 are so clear that high accuracy positioning can take place.

Other Embodiments

The embodiments of the invention have been described above, but the invention is not limited to these embodiments. For example, the mask 410 and the fixing plate 250 may be spaced from each other. That is, an embodiment in which a spacer jig is interposed between the mask 410 and the fixing plate 250 is also included in the scope of the technical ideas of the invention.

In the above embodiments, the pressing means 450 is provided on the alignment jig 400. However, this is not limitative. For example, if an ultraviolet curing adhesive agent is used as an adhesive agent for joining the fixing plate 250 and the ink-jet recording head 220, the adhesive agent is coated onto the joining surface of the fixing plate 250. Then, with the fixing plate 250 and the ink-jet recording head 220 in contact, ultraviolet radiation is applied to cure the adhesive agent, whereby the fixing plate 250 and the ink-jet recording head 220 can be joined. Thus, the pressing means 450 can be omitted. The ultraviolet curing adhesive agent need not be cured, with the fixing plate 250 and the ink-jet recording head 220 being pressed under a predetermined pressure, unlike a thermosetting adhesive agent. If pressure is applied, the ink-jet recording head 220 and the fixing plate 250 can be joined together with high accuracy, with positional displacement between them being prevented.

Joining using the ultraviolet curing adhesive agent imparts a relatively low joining strength. Thus, it is recommendable that after the fixing plate 250 and the ink-jet recording head 220 are joined using the ultraviolet curing adhesive agent, the periphery of corners defined by the ink-jet recording head 220 and the fixing plate 250 is fixed using a thermosetting adhesive agent. By this measure, the fixing plate 250 and the ink-jet recording head 220 can be joined highly accurately and firmly to enhance reliability.

In the above embodiments, the fixing plate 250 comprising the flat plate is illustrated as the fixing member for joining the plurality of ink-jet recording heads 220 thereto. However, the fixing member is not limited to the fixing plate 250. For example, the cover head 240 may be used as the fixing member for holding the plurality of ink-jet recording heads 220, thereby directly joining the plurality of ink-jet recording heads 220 while positioning them. Even in this case, the plurality of ink-jet recording heads 220 can be joined, with high accuracy positioning, with the use of the aforementioned alignment jig 400.

In the above embodiments, the ink-jet recording head 220 of the flexural vibration type is illustrated, but this is not limitative. It goes without saying that the invention can be applied to head units having ink-jet recording heads of various structures, such as, for example, an ink-jet recording head of the longitudinal vibration type in which piezoelectric materials and electrode-forming materials are alternately stacked, and expanded and contracted in the axial direction, and an ink-jet recording head for ejecting ink droplets by bubbles produced by heat generation of a heat-generating element or the like.

In the above embodiments, the head unit having the ink-jet recording heads for ejection ink as liquid-jet heads to be aligned is illustrated as an example. However, the invention can be generally applied in producing liquid-jet head units having wide varieties of liquid-jet heads. Examples of the liquid-jet heads are recording heads for use in image recording devices such as printers, color material jet heads for use in the production of color filters such as liquid crystal displays, electrode material jet heads for use in the formation of electrodes for organic EL displays and FED (face emitting displays), and bio-organic material jet heads for use in the production of biochips. It should be understood that such changes, substitutions and alterations can be made in the invention without departing from the spirit and scope of the invention as defined by the appended claims.

What is claimed is:

1. A method for producing a liquid-jet head unit including a plurality of liquid-jet heads and a fixing member, each of the liquid-jet heads having a nozzle plate which includes nozzle orifices for jetting a liquid through an ejection surface, comprising the steps of:

holding the liquid-jet heads on a fixing member at the ejection surface of the liquid-jet heads;

holding the fixing member with a mask in direct contact with the fixing member, the mask being a transparent member provided with a reference marks for alignment with an alignment marks provided on each of the nozzle plates, the reference marks being formed within the transparent member;

aligning the alignment marks with the reference marks; and bonding the nozzle plates of the plurality of liquid-jet heads and the fixing member by an adhesive agent.

2. The method for producing a liquid-jet head unit according to claim 1, wherein the mask has a mask body, and a protective plate stuck to a surface of the mask body facing the liquid-jet heads, the reference marks are formed at a boundary between the mask body and the protective plate, the boundary serving as a joining surface, and the fixing member is held by the protective plate in direct contact with the fixing member.

3. The method for producing a liquid-jet head unit according to claim 1, wherein the mask has a mask body, and a protective plate stuck to a surface of the mask body facing the liquid-jet heads, the reference marks are formed on a surface of the mask body facing the liquid-jet heads, or on a surface of the protective plate facing the mask body, a predetermined space is present between the reference marks and the alignment marks, and the fixing member is held by the protective plate in direct contact with the fixing member.

4. The method for producing a liquid-jet head unit according to claim 2, wherein the protective plate has a smaller area in a plane direction than an area of the mask body, and is stuck to a region of the mask body which overlaps the reference marks.

5. The method for producing a liquid-jet head unit according to claim 1, wherein the protective plate has a smaller area in a plane direction than an area of the mask body, and is stuck to the mask body in a region opposed to the reference marks.

6. The method for producing a liquid-jet head unit according to claim 1, wherein the mask comprises a mask body having the reference marks formed inside.

7. The method for producing a liquid-jet head unit according to claim 6, wherein the mask body has a protrusion formed in a region where the reference marks are formed, the protrusion protruding toward the liquid-jet heads.

* * * * *